United States Patent
Hofmann et al.

(10) Patent No.: US 11,787,265 B2
(45) Date of Patent: Oct. 17, 2023

(54) ELECTRICAL HEATING DEVICE FOR MOTOR VEHICLES

(71) Applicant: Bayerische Motoren Werke Aktiengesellschaft, Munich (DE)

(72) Inventors: Philipp Hofmann, Wiedenzhausen (DE); Patrick Oswald, Munich (DE); Peter Satzger, Landsberg am Lech (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 993 days.

(21) Appl. No.: 16/276,784

(22) Filed: Feb. 15, 2019

(65) Prior Publication Data

US 2019/0176574 A1    Jun. 13, 2019

Related U.S. Application Data

(63) Continuation of application No. PCT/EP2017/069532, filed on Aug. 2, 2017.

(30) Foreign Application Priority Data

Aug. 18, 2016 (DE) .................. 10 2016 215 549.0

(51) Int. Cl.
*B60H 1/22* (2006.01)
*F24D 13/02* (2006.01)
(Continued)

(52) U.S. Cl.
CPC ......... *B60H 1/2218* (2013.01); *B60H 1/2227* (2019.05); *F24D 13/024* (2013.01);
(Continued)

(58) Field of Classification Search
CPC ............. B60H 1/2218; B60H 1/2227; B60H 2001/2256; F24D 13/024; F24D 19/1096; H05B 3/22; Y02B 30/00
(Continued)

(56) References Cited

U.S. PATENT DOCUMENTS 4,737,917 A * 4/1988 Perron .................. G01K 1/026
374/134
5,948,303 A * 9/1999 Larson ................. A47C 21/048
219/486

(Continued)

FOREIGN PATENT DOCUMENTS

CN    1526260 A    9/2004
CN    1600589 A    3/2005
(Continued)

OTHER PUBLICATIONS

International Search Report (PCT/ISA/210) issued in PCT Application No. PCT/EP2017/069532 dated Dec. 18, 2017 with English translation (six (6) pages).
(Continued)

*Primary Examiner* — Jimmy Chou
(74) *Attorney, Agent, or Firm* — Crowell & Moring LLP

(57) ABSTRACT

A radiant heating device for producing radiant heat in a passenger compartment of a motor vehicle includes a heating surface for emitting heat radiation, a heating element for providing heating power, a first temperature sensor for detecting a first temperature in a specific spot and for providing a corresponding first temperature indication, and a second temperature sensor for detecting a second temperature on the surface and for providing a corresponding second temperature indication. In order to detect a local overheating of the heating surface, a difference between the two
(Continued)

temperature indications is determined. In the event of a defect, a protective operating mode is then selected.

12 Claims, 1 Drawing Sheet

(51) Int. Cl.
   *F24D 19/10* (2006.01)
   *H05B 3/22* (2006.01)
(52) U.S. Cl.
   CPC ........... *F24D 19/1096* (2013.01); *H05B 3/22* (2013.01); *B60H 2001/2256* (2013.01); *B60H 2001/2265* (2013.01); *Y02B 30/00* (2013.01)
(58) Field of Classification Search
   USPC ........ 219/202, 203, 204, 529, 545, 546, 549
   See application file for complete search history.

(56) References Cited

U.S. PATENT DOCUMENTS

| | | | | |
|---|---|---|---|---|
| 6,093,908 | A * | 7/2000 | Haag | B62D 1/065 219/204 |
| 6,933,469 | B2 * | 8/2005 | Ellis | A61F 7/00 219/217 |
| 7,816,628 | B2 * | 10/2010 | Fernandez | H05B 3/342 219/217 |
| 8,330,079 | B2 * | 12/2012 | Yasuda | B62D 1/065 74/552 |
| 9,044,867 | B2 * | 6/2015 | Rothschild | H01M 50/20 |
| 9,980,526 | B2 * | 5/2018 | Silverberg | A41D 13/0058 |
| 10,093,338 | B2 * | 10/2018 | Hisajima | H05B 3/54 |
| 10,292,207 | B2 * | 5/2019 | Fassbender | B62D 1/065 |
| 10,893,576 | B2 * | 1/2021 | Strecker | H05B 1/0272 |
| 11,032,875 | B2 * | 6/2021 | Lisseman | H05B 3/34 |
| 2002/0005406 | A1 * | 1/2002 | Fukunaga | H05B 6/6455 219/711 |
| 2002/0033389 | A1 * | 3/2002 | Sugiyama | H05B 3/34 219/548 |
| 2002/0117495 | A1 * | 8/2002 | Kochman | F24D 13/024 219/549 |
| 2003/0111453 | A1 * | 6/2003 | Haag | B62D 1/065 219/204 |
| 2003/0132212 | A1 * | 7/2003 | Sowa | H05B 3/342 219/529 |
| 2004/0026405 | A1 * | 2/2004 | Alvite | H05B 3/342 219/486 |
| 2004/0149711 | A1 * | 8/2004 | Wyatt | A61F 7/007 219/217 |
| 2004/0195232 | A1 | 10/2004 | Wilkins | |
| 2005/0016982 | A1 * | 1/2005 | Campf | H05B 1/0272 219/211 |
| 2005/0061798 | A1 | 3/2005 | Uhl | |
| 2006/0001727 | A1 * | 1/2006 | Haas | A41D 13/0051 347/194 |
| 2006/0151475 | A1 * | 7/2006 | Horvath | H05B 3/36 219/529 |
| 2006/0261057 | A1 * | 11/2006 | Horvath | H05B 3/342 219/529 |
| 2007/0108187 | A1 * | 5/2007 | Ding | H05B 3/82 219/492 |
| 2007/0114226 | A1 * | 5/2007 | Sone | G03G 15/2039 399/328 |
| 2007/0228028 | A1 * | 10/2007 | Starck | H05B 3/34 219/204 |
| 2008/0083720 | A1 * | 4/2008 | Gentile | A43B 3/35 219/211 |
| 2008/0210048 | A1 * | 9/2008 | Yoneyama | B62D 1/065 74/552 |
| 2008/0290080 | A1 * | 11/2008 | Weiss | H05B 1/0238 219/202 |
| 2010/0071502 | A1 * | 3/2010 | Yasuda | B62D 1/065 74/552 |
| 2010/0176110 | A1 | 7/2010 | Ogino et al. | |
| 2010/0222929 | A1 | 9/2010 | Ostermeier et al. | |
| 2012/0273475 | A1 * | 11/2012 | An | H05B 3/34 219/508 |
| 2012/0305540 | A1 * | 12/2012 | Paxton | B62D 1/065 219/204 |
| 2012/0312796 | A1 * | 12/2012 | Cho | H05B 3/34 118/200 |
| 2013/0001212 | A1 * | 1/2013 | Mangoubi | H05B 3/34 219/211 |
| 2014/0326708 | A1 * | 11/2014 | Barfuss | B60N 2/5685 219/202 |
| 2015/0014424 | A1 | 1/2015 | Bytzek et al. | |
| 2015/0028015 | A1 * | 1/2015 | Park | B62D 1/065 219/204 |
| 2015/0028116 | A1 | 1/2015 | Satzger et al. | |
| 2015/0060430 | A1 * | 3/2015 | Tsuge | H05B 3/145 219/211 |
| 2015/0069245 | A1 * | 3/2015 | Nagahisa | G01V 8/10 250/340 |
| 2015/0129574 | A1 * | 5/2015 | Sun | C23C 4/134 219/393 |
| 2015/0136751 | A1 * | 5/2015 | Hanschke | H05B 1/0236 219/202 |
| 2015/0336601 | A1 * | 11/2015 | Van'tZelfde | B62D 1/046 307/9.1 |
| 2016/0059670 | A1 | 3/2016 | Satzger et al. | |
| 2016/0068044 | A1 | 3/2016 | Sagou et al. | |
| 2016/0096543 | A1 * | 4/2016 | Naitou | H05B 3/34 219/204 |
| 2017/0014078 | A1 * | 1/2017 | Yamazak | H05B 3/03 |
| 2017/0321902 | A1 | 11/2017 | Ishikawa et al. | |

FOREIGN PATENT DOCUMENTS

| | | |
|---|---|---|
| CN | 101678737 A | 3/2010 |
| CN | 105142942 A | 12/2015 |
| DE | 20 2006 007 548 U1 | 9/2006 |
| DE | 10 2012 202 370 A1 | 8/2013 |
| DE | 10 2013 214 548 A1 | 1/2015 |
| DE | 10 2013 214 554 A1 | 1/2015 |
| DE | 11 2014 001 899 T5 | 2/2016 |
| DE | 11 2015 003 422 T5 | 5/2017 |
| EP | 1 361 089 A2 | 11/2003 |
| EP | 1 361 089 B1 | 5/2006 |
| EP | 2 117 857 B1 | 8/2011 |
| JP | 5072826 B2 | 11/2012 |
| JP | 2016-85958 A | 5/2016 |

OTHER PUBLICATIONS

German-language Written Opinion (PCT/ISA/237) issued in PCT Application No. PCT/EP2017/069532 dated Dec. 18, 2017 (six (6) pages).

German-language Search Report issued in counterpart German Application No. 10 2016 215 549.0 dated Apr. 19, 2017 with partial English translation (10 pages).

Chinese-language Office Action issued in Chinese Application No. 201780046155.0 dated Jun. 17, 2021 with English translation (17 pages).

* cited by examiner

ELECTRICAL HEATING DEVICE FOR MOTOR VEHICLES

CROSS REFERENCE TO RELATED APPLICATIONS

This application is a continuation of PCT International Application No. PCT/EP2017/069532, filed Aug. 2, 2017, which claims priority under 35 U.S.C. § 119 from German Patent Application No. 10 2016 215 549.0, filed Aug. 18, 2016, the entire disclosures of which are herein expressly incorporated by reference.

BACKGROUND AND SUMMARY OF THE INVENTION

The invention relates to heating devices for motor vehicles, in particular electrically heated heating surfaces which are intended to warm the occupants of a motor vehicle via thermal radiation.

In modern motor vehicles, the heat of the passenger compartment is not just heated via heating the air flowing into the passenger compartment but also via flat heating devices. The heating devices constitute heatable surfaces which are intended to warm passengers in the vehicle interior via direct contact with a part of a body of a vehicle occupant. For example, such heating devices can be arranged on grip surfaces of the steering wheel, in vehicle seats, in armrest surfaces and the like.

Furthermore, heating devices can be provided as radiant heating devices. Radiant heating devices likewise have surfaces as heated surfaces which, at surface temperatures of, for example, between 40 and 150° C., lead to noticeable thermal radiation for the vehicle occupants and are therefore intended to increase the heating comfort.

In order to avoid overheating of the heating surfaces, a temperature sensor is generally provided, with the aid of which, in conjunction with a suitable temperature control system, the temperature can be kept constant or it is possible to ensure that the temperature does not exceed a predetermined temperature threshold value. The temperature sensor can detect the temperature of the heating device at a point or averaged over a surface area.

The heating surface of a radiant heating device is designed for the two-dimensional output of thermal radiation. A temperature of the heating surface which corresponds to an equilibrium between power supply and heat output is established.

Depending on the size of the heating surface of the heating device, the latter can be partly covered, for example if items of luggage are deposited on or against part of the heating surface. During operation of the heating device, this can lead to the covered part of the heating surface of the heating device being heated considerably as compared with the uncovered part of the heating surface, since the dissipation of heat from the covered part of the heating surface is lower than via the uncovered part of the heating surface.

Depending on the arrangement of a temperature sensor measuring at a point, this temperature increase cannot be detected, so that the control system effects no reduction in the heat output and, because of the temperature increase, under certain circumstances it is possible for damage to occur to the covering object, such as an item of luggage, for example, or damage to the heating device. In the case of a two-dimensionally measuring temperature sensor, only the average temperature value over the entire heating surface is usually determined, so that, depending on the proportion of the covered part of the heating surface, the local temperature increase is determined only as a lower temperature increase as a result of the averaging of the temperature of the heating surface, and is therefore not adequate for complete control of the temperature in the covered surface area.

The document DE 10 2013 214548 A1, for example, discloses an electrical heating device for heating the passenger compartment in a motor vehicle, wherein the heating action is carried out via infrared radiation in the passenger compartment.

The document DE 10 2013 214554 A1 also discloses a method for heating an interior of a vehicle with the aid of infrared radiation, wherein an output distribution between a central heating system and the heating surfaces formed as infrared radiators is provided in order to control the temperature of the vehicle interior.

The document EP 2 117 857 B1 discloses a method for operating a heating and/or cooling unit, which can be switched with different output stages. For example, a second output stage is switched when a vehicle door is unlocked or opened.

It is therefore an object of the present invention to provide a heating device, in particular for use in a motor vehicle, in which an undesired temperature increase in the event of partial coverage of the heating surface can be avoided.

This and other objects are achieved by the heating device, by a heating system, and by a method for operating a heating device, in accordance with embodiments of the invention.

According to a first aspect, a radiant heating device for providing radiant heat in a passenger compartment of a motor vehicle is provided, comprising:
  a heating surface for outputting thermal radiation;
  a heating element for providing heat output;
  a first temperature sensor for detecting a first temperature at a point and for providing a corresponding first temperature indication; and
  a second temperature sensor for detecting a second temperature over an area and providing a corresponding second temperature indication.

One aspect of the above heating device consists in open-loop or closed-loop control of the temperature of the heating surface with the aid of a first temperature sensor, which measures a first temperature at a point on a heating surface of the heating device, and of providing a second temperature sensor which measures a second temperature of the heating surface, i.e. provides a representative value of an average temperature of the heating surface or a temperature value resulting from the temperature distribution over the entire heating surface.

According to a further aspect, a heating system for heating a passenger compartment of a motor vehicle is provided, comprising:
  the above radiant heating device;
  a control system which is designed:
    to detect the first and the second temperature indication,
    to determine a differential temperature indication as a difference between the first and the second temperature indication; and
    to activate the radiant heating device in a protective operating mode with a reduced heat output when the magnitude of the differential temperature indication exceeds a predefined threshold amount.

In the above heating system, with the aid of the control system, a difference between the measured first and second temperatures can be determined and, depending on the difference determined, conclusions can be drawn about partial blockage of the heating surface, i.e. about a covered partial area of the heating surface. Thus even blockage of a relatively small proportion of the heating surface can be detected. If partial blockage of the heating surface is detected, then the supply of the heat output can be reduced appropriately, in particular such that no critical temperature increase in covered surface areas of the heating surface can occur.

In the event that a partial area of the heating surface is covered by an object and therefore the output of heat over this partial area is reduced, the second temperature value detected by the second temperature sensor rises. If, during the partial coverage of the heating surface, the first temperature sensor is not covered, the measured first temperature value remains substantially unchanged. The difference between the temperature values changes and, with the aid of a threshold value comparison, the event of such a partial coverage can be reliably detected.

If, in the event of a partial coverage of the heating surface, the first temperature sensor is covered, then the first temperature value rises accordingly, while the second temperature value rises more slightly because of the averaging. Accordingly, the result is likewise a difference between the first and second temperature value. With the aid of a further threshold value comparison, the temperature difference, which now has a sign different from the previous case, can also be reliably detected.

If partial coverage of the heating surface is established in this way, the heating surface can be protected against a critical temperature increase by an appropriate reduction of the heat output to a predefined value. In addition, by predefining a value range in which the difference of the temperature values may lie, the heat output can be controlled, so that a critical temperature value is not exceeded in the covered partial area.

Furthermore, the heating element can be formed with the aid of a heating wire, in order to provide uniform heat output over the entire heating surface when electric power is supplied. Alternatively, the heating element can be formed as a heating mat, for example of carbon fibers, with a heating varnish or with heating ink.

Provision can be made for the first temperature sensor for measuring the first temperature to be arranged, for example, in the center of the heating surface, in particular in a central area which is removed from the edge of the heating surface by more than 10% of the extent of the heating surface, and in particular to be formed as an NTC resistor or PTC resistor.

Furthermore, the second temperature sensor for measuring the second temperature can be arranged in particular two-dimensionally between the heating element and the heating surface, in order to provide the second temperature indication in a way corresponding to a distribution of local temperatures of the heating surface, in particular as an average of the temperatures of the heating surface.

Furthermore, the second temperature sensor can be provided as a resistance wire which is distributed in the heating surface, and which, for example, runs in serpentine lines.

Alternatively, the heating element can be used as a second temperature sensor for measuring the second temperature, in order to provide the second temperature indication in a way corresponding to a distribution of local temperatures of the heating surface, in particular as an average of the temperatures of the heating surface as a function of an electrical resistance of the heating element.

According to one embodiment, the first and/or the second temperature sensor can be formed to indicate the first and the second temperature indication as an electric resistance, an electric voltage, an electric current or another electrical variable.

Furthermore, in the heating system the control system can be designed to determine the differential temperature indication as a difference between the first and the second temperature indication.

The predefined threshold amount can have a value between, for example, 2° K and 10° K.

In particular, the control system can be designed to carry out temperature control of the heating surface, in order to control the temperature of the heating surface to a predefined target temperature when the magnitude of the differential temperature indication falls below the predefined threshold amount.

Furthermore, the control system can be designed to carry out temperature control of the heating surface in the protective operating mode, in order to control the temperature of the heating surface to a target temperature which is lower than the predefined target temperature for the normal operating mode.

According to a further aspect, a method for operating a radiant heating device having a heating surface is provided, comprising the following steps:
  detecting a first temperature indication which corresponds to a first temperature of the heating surface detected at a point;
  detecting a second temperature indication for a second temperature, which indicates an average temperature of the heating surface;
  determining a differential temperature indication as a difference between the first and the second temperature indication; and
  activating the radiant heating device in a protective operating mode with a reduced heat output when the magnitude of the differential temperature indication exceeds a predefined threshold amount.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
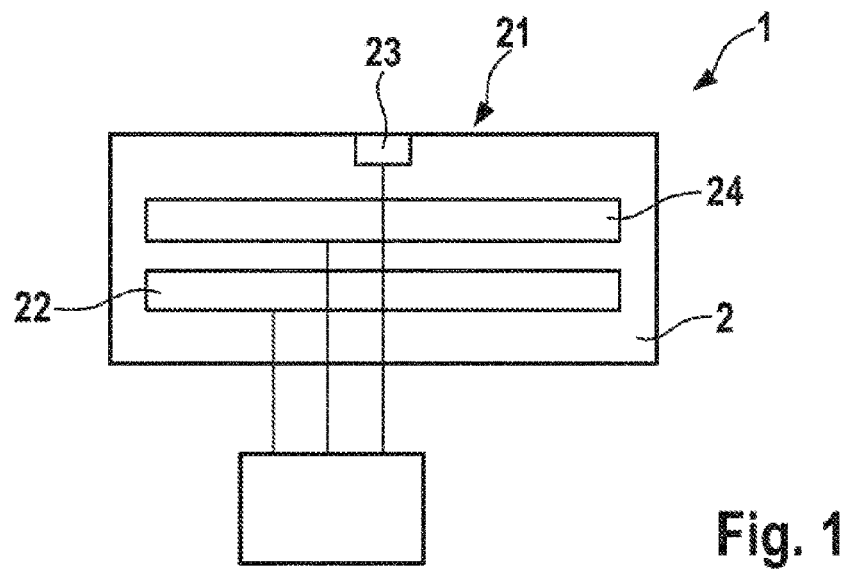
FIG. 1 is a schematic representation of a heating system comprising a radiant heating device with a first temperature sensor and a second temperature sensor.

FIG. 1 shows a schematic representation of a heating system 1 comprising a radiant heating device 2 and a control system 3. The radiant heating device 2 is formed as an infrared surface radiator and has a heating surface 21 which can be heated with the aid of a heating element 22. The heating element 22 can, for example, comprise an electric heating unit having a heating wire (not shown) extending two-dimensionally or laid in loops, in order to provide a heat output uniformly over the entire heating surface 21 when electric power is supplied.

Provided between the heating surface 21 and the heating element 22 is a first temperature sensor 23, which measures a temperature of the heating surface 21 at a specific measuring point. The first temperature sensor 23 provides a first temperature indication corresponding to the measured temperature, which represents a first temperature and, for example, can indicate an electric resistance or another electrical variable. For example, the first temperature sensor can be formed as a heat-sensitive resistor, such as, for example, in the form of an NTC or PTC.

A second temperature sensor 24, which permits two-dimensional temperature detection, is provided. The second temperature sensor can extend substantially over the entire area of the heating surface 21, in particular between the heating surface 21 and the heating element 22, and provide a second temperature indication, which represents a second temperature and, for example, can indicate an electric resistance or another electrical variable. The second temperature indication can result from the local temperatures of the heating surface 21 from the temperature distribution over the heating surface 21. In particular, the second temperature sensor 24 can provide an average of the temperature distribution of the heating surface 21. The second temperature sensor 24 can be formed with the aid of a heat-sensitive resistance wire, which is laid in loops over the surface area of the heating surface 21.

The control system 3 is used to supply the heating element 22 with electric power, in order to bring about a corresponding heating action there with a heat output corresponding to the electric power. The supply of the heat output can be carried out cyclically (by switching cyclically between two output stages, normally between maximum output and no output) or variably.

In addition, the control system 3 is connected to the first and second temperature sensor 23, 24, in order to detect the first and second temperature indication provided thereby.

As a normal operating mode, the control system 3 can perform temperature control of the heating surface in that, depending on a temperature value detected by one of the two temperature sensors 23, 24, the heat output supplied to the heating element 22 can be varied in order to control the temperature of the heating surface 21 to a predefined target temperature. A corresponding target temperature indication can be predefined by adjusting a manually operable operating element or by a higher-order heating control system. To this end, the target temperature indication can be compared with the first temperature indication, when the first temperature sensor 23 is used, or with the second temperature indication, when the second temperature sensor 24 is used for the temperature control and, depending on an extent to which the target temperature indication is undershot by the corresponding first or second temperature indication, the heat output can be increased and, when the target temperature indication is reached or exceeded by the first or second temperature indication, the heat output can be reduced appropriately.

Furthermore, in accordance with a protective function, the control system 3 can use the first and second temperature indication provided by the temperature sensors 23, 24 to detect partial coverage of the heating surface 21 by an object. Partial coverage can lead to a local temperature increase, which can damage the covering object or the radiant heating device 2.

Figure 2:
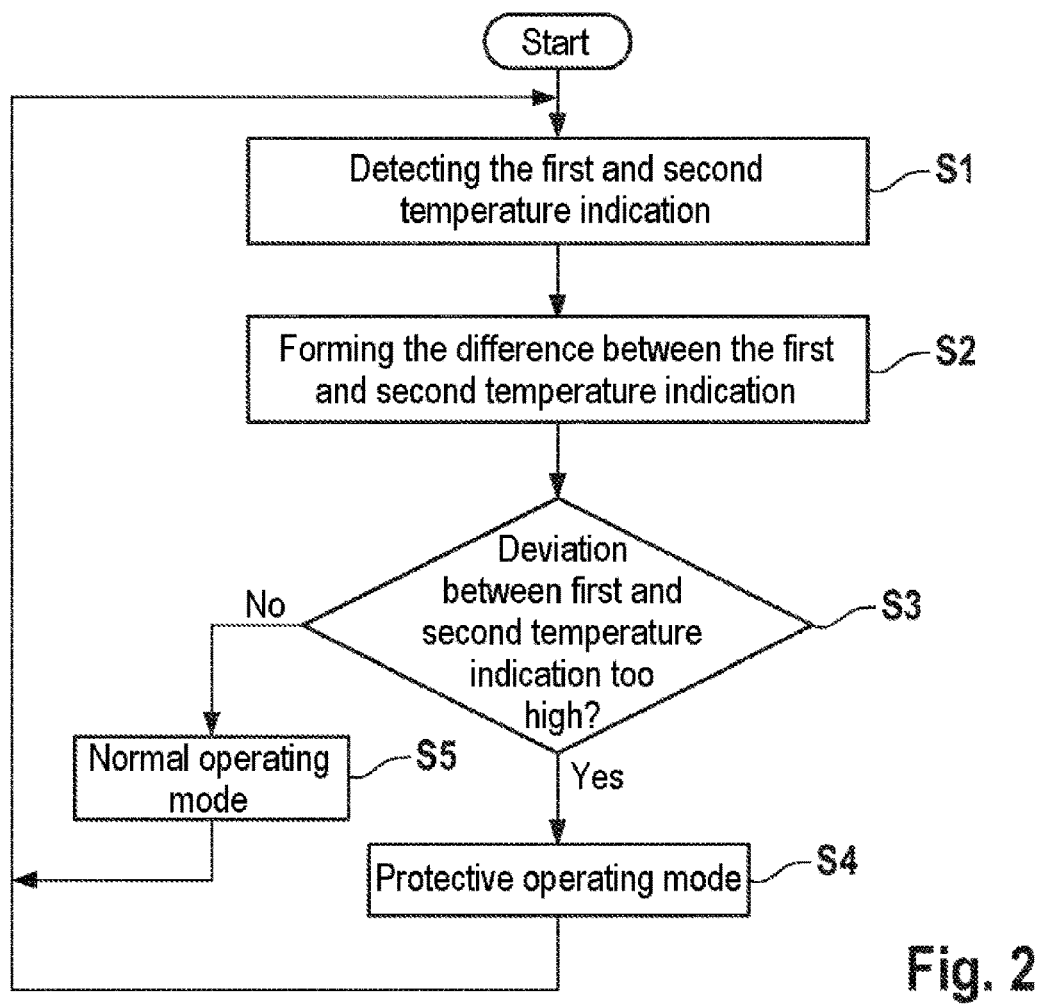
FIG. 2 is a flowchart to illustrate a method for operating a radiant heating device.

To this end, a method as represented illustratively by using the flowchart of FIG. 2 can be described in the control system 3. In step S1, the first and second temperature indications are detected by the temperature sensors 23, 24.

In step S2, a difference or a deviation, for example in the form of a difference, is formed between the first and second temperature indication, in order to obtain a differential temperature indication.

In step S3, a check is made as to whether a magnitude of the differential temperature indication is higher than a predetermined threshold amount. If exceeding the predetermined threshold amount is determined (alternative: yes), then the method is continued with step S4, otherwise in step S5 the above-described normal operating mode is assumed and a jump back to step S1 is made. For example, coverage of the partial area can be detected when a temperature deviation between the first and second temperature, represented by the first and second temperature indication, of more than a predefined value of between 2° K to 10° K is detected.

Following the detection of a differential temperature indication determined by the deviation between the first and second temperature indications, a protective operating mode is assumed in step S4. The method is then continued with step S1. In the normal operating mode, the control of the temperature of the heating surface is carried out as described above.

In the reducing operating mode, the heat output supplied to the heating element 22 is to be reduced such that a critical temperature increase in covered partial areas cannot occur. To this end, for example, the control can be deactivated and the heat output supplied to the heating element 22 can be set to a predetermined reduced heat output, in which a critical temperature increase even in the covered partial areas can be ruled out, or the supply of the heat output can be interrupted completely.

Alternatively, the control can be continued with the predefinition of a reduced target temperature indication, at which no critical temperature increase can result, even in covered partial areas.

For example, during a normal operating mode, a target temperature indication can indicate a temperature of 45°, while in the protective operating mode, a target temperature indication predefines a target temperature of 35°. Target temperature indications which avoid a critical temperature increase with all possible partial coverages can be determined, for example, by empirical investigations.

LIST OF DESIGNATIONS

1 Heating system
2 Radiant heating device
21 Heating surface
22 Heating element
23 First temperature sensor
24 Second temperature sensor
3 Control system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A radiant heating device for providing radiant heat in a passenger compartment of a motor vehicle, comprising:
   a heating surface for outputting thermal radiation;
   a first temperature sensor for detecting a first temperature at a point of the heating surface and for providing a corresponding first temperature indication;
   a second temperature sensor for detecting a second temperature over an area of the heating surface and providing a corresponding second temperature indication; and a heating element for providing heat output to the point of the heating surface and the area of the heating surface, wherein the point of the heating surface lies within the area of the heating surface, wherein the second temperature sensor for detecting the second temperature is arranged two-dimensionally between the heating element and the heating surface, in order to provide the second temperature indication in a way corresponding to a distribution of local temperatures of the heating surface.

2. The radiant heating device as claimed in claim 1, wherein
the heating element is formed with a heating wire, in order to provide uniform heat output over the entire heating surface when electric power is supplied.

3. The radiant heating device as claimed in claim 1, wherein
the first temperature sensor for detecting the first temperature is arranged centrally in the heating surface in a central area which is spaced away from an edge of the heating surface by more than 10% of the extent of the heating surface.

4. The radiant heating device as claimed in claim 3, wherein
the first temperature sensor is an NTC resistor or a PTC resistor.

5. The radiant heating device as claimed in claim 1, wherein
the distribution of local temperatures of the heating surface is an average of the temperatures of the heating surface.

6. The radiant heating device as claimed in claim 1, wherein
the second temperature sensor is a resistance wire distributed in the heating surface, which resistance wire runs in serpentine lines.

7. The radiant heating device as claimed in claim 1, wherein
each of the first and the second temperature indication is provided as one of: an electric resistance, an electric voltage, an electric current or another electrical variable.

8. A heating system for heating a passenger compartment of a motor vehicle, comprising:
a radiant heating device as claimed in claim 1;
a control system which is configured to:
detect the first and the second temperature indication,
determine a differential temperature indication as a difference between the first and the second temperature indication; and
activate the radiant heating device in a protective operating mode with a reduced heat output when a magnitude of the differential temperature indication exceeds a predefined threshold amount.

9. The heating system as claimed in claim 8, wherein
the control system is further configured to:
determine the differential temperature indication as a difference between the first and the second temperature indication.

10. The heating system as claimed in claim 8, wherein
the predefined threshold amount has a value between 2° K and 10° K.

11. The heating system as claimed in claim 8, wherein
the control system is further configured to:
carry out temperature control of the heating surface in order to control the temperature of the heating surface to a predefined target temperature when the magnitude of the differential temperature indication falls below the predefined threshold amount.

12. The heating system as claimed in claim 11, wherein
the control system is further configured to:
carry out temperature control of the heating surface in the protective operating mode in order to control the temperature of the heating surface to a target temperature which is lower than the predefined target temperature for the normal operating mode.

\* \* \* \* \*